(12) United States Patent
MacPherson et al.

(10) Patent No.: US 8,719,791 B1
(45) Date of Patent: May 6, 2014

(54) DISPLAY OF AGGREGATED STACK TRACES IN A SOURCE CODE VIEWER

(75) Inventors: Luke David MacPherson, Pyrmont (AU); Shane Stephens, Ryde (AU)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 13/484,433

(22) Filed: May 31, 2012

(51) Int. Cl.
*G06F 9/44* (2006.01)

(52) U.S. Cl.
USPC ........... 717/124; 717/104; 717/106; 717/129; 717/131

(58) Field of Classification Search
CPC .... G06F 8/34; G06F 11/3636; G06F 11/3668
See application file for complete search history.

(56) References Cited

U.S. PATENT DOCUMENTS

| | | | |
|---|---|---|---|
| 2006/0026579 A1* | 2/2006 | Gardner | 717/151 |
| 2006/0265687 A1* | 11/2006 | Lin | 717/101 |
| 2008/0256519 A1* | 10/2008 | Shen | 717/128 |

OTHER PUBLICATIONS

Statistical Reliability Estimation of Microprocessor-Based Systems, Savino et al. (http://porto.polito.it/2439063/2/2012_TC_MicroReliability_AuthorVersion.pdf).*

* cited by examiner

*Primary Examiner* — Don Wong
*Assistant Examiner* — Deric Ortiz
(74) *Attorney, Agent, or Firm* — Sterne, Kessler, Goldstein & Fox P.L.L.C.

(57) ABSTRACT

Embodiments described herein relate to systems and methods for displaying aggregated stack traces in a source code viewer. One or more execution identifiers are received in response to an execution of a first program executing on one or more client computing devices. Each execution identifier can include one or more stack frames, which correspond to a function call within the first program. An error-likeliness score is identified for each execution identifier. An error-weight is determined for each of the execution identifiers based on the identified error-likeliness scores for instances of the execution identifiers.

34 Claims, 8 Drawing Sheets

| | | |
|---|---|---|
| 702 { | 1 | functionThatCausesAnError() { |
| | 2 | return null; } |
| 704 { | 3 | functionThatCrashes(input) { |
| | 4 | return input.length; } |
| 706 { | 5 | main() { |
| | 6 | a = functionThatCausesAnError(); |
| | 7 | functionThatCrashes(a); } |

DISPLAY OF AGGREGATED STACK TRACES IN A SOURCE CODE VIEWER

BACKGROUND

1. Field

Embodiments are generally related to systems and methods for displaying aggregated stack traces.

2. Related

In general, when a program running on a computer generates an error, a stack trace is automatically generated which provides insight into the cause(s) of the error. This information is often analyzed by source code developers in order to determine the root of the error and potential fixes. However, as the complexity of a computer program increases, stack traces may not necessarily identify the exact location of the error within the source code. Since the point at which a program fails is often distinct from the location of the error, a developer may spend a significant amount of time analyzing the source code in order to determine the lines of code generating the error.

BRIEF SUMMARY

Embodiments described herein relate to systems and methods for displaying aggregated stack traces in a source code viewer. One or more stack traces are received by a computing device, in response to an error detected from a first program executing on one or more client computing devices. Each stack trace includes one or more stack frames, which correspond to a function call within the first program. A call stack is identified for each of the one or more stack traces. The call stack is set of stack frames including a function that caused the error of the first program. An error-likeliness score is identified for each stack frame of the call stack. The error-likeliness score is identified based on a distance of the stack frame from the stack frame containing a crash point. An error-weight is determined for each of the stack frames of the call stack based on the identified error-likeliness scores for instances of the stack frames.

In another embodiment, one or more execution identifiers are received by a computing device, in response to an execution from a first program operating on one or more client computing devices. Each execution identifier can include a log providing a list of all the methods called during the execution of the first program up until a program error is detected. An error-likeliness score is identified for each execution identifier. The error-likeliness score is identified based on a duration between the time that a function is called and the time that the program error is detected. An error-weight is determined for each of the execution identifiers based on the identified error-likeliness scores for instances of the stack frames.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7 is a diagram of an example of a source code viewer in accordance with an embodiment.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
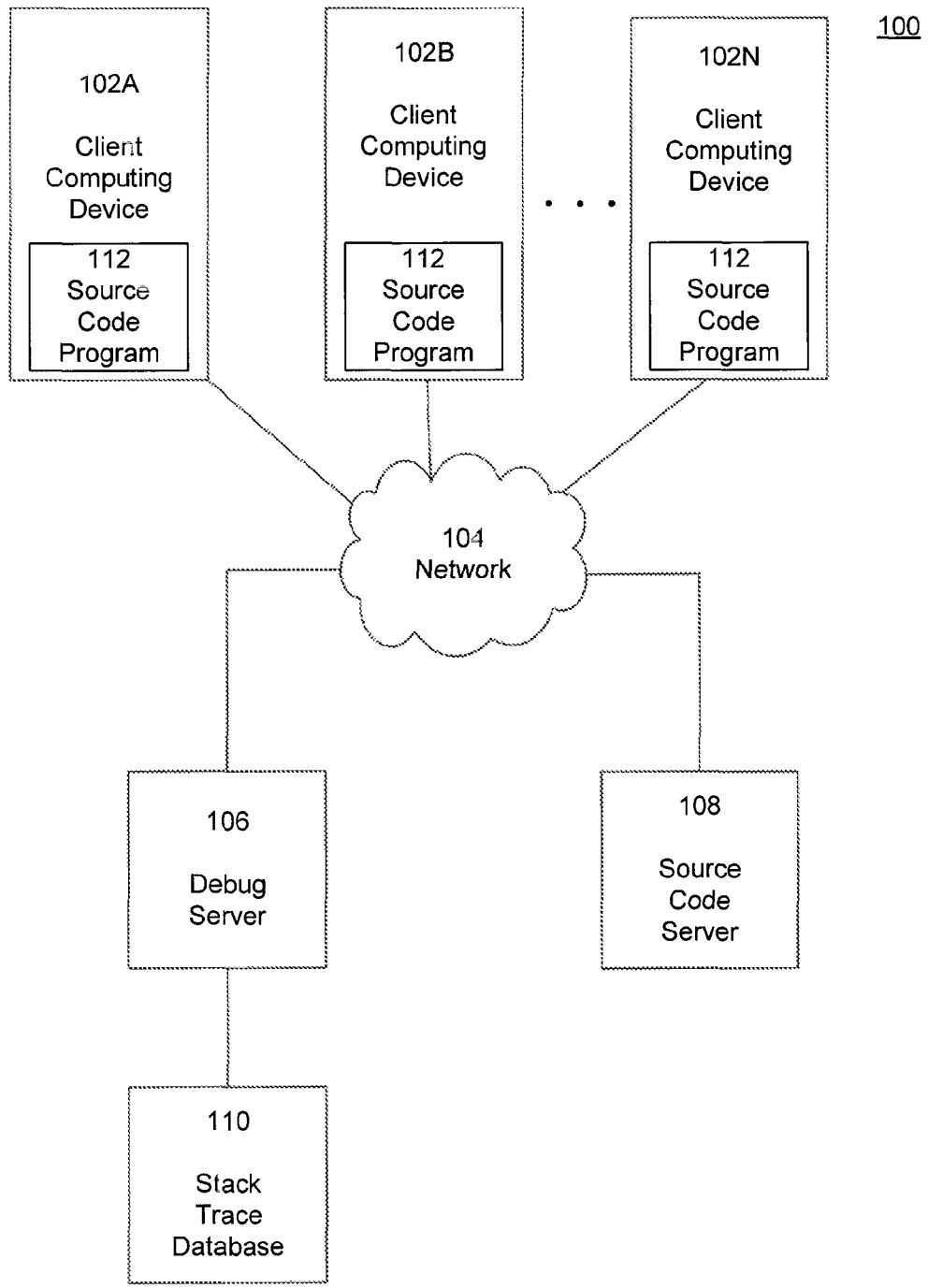
FIG. 1 is a diagram illustrating an example system in which embodiments may be implemented.

Developers of software programs have many different techniques to trace and debug software programs. In general, the process of debugging source code of a software program follows a standard flow: during the execution of the software program, a developer may be alerted to an error or "bug" and then utilize a software debugger to examine the behavior of the program. Utilizing a software debugger requires the developer to set one or more breakpoints in the source code at points within the source code that are believed to have generated the error. Upon the debugger hitting a breakpoint, the developer may step through the source code line by line in order to analyze potential problems. However, this standard flow of analyzing source code has drawbacks for developers.

In order to set effective break points within the source code, the developer needs to know in advance which portion of the source code may generate an error. This becomes increasingly difficult to do when dealing with complex source code. Additionally, a bug may generate an error only during specific execution conditions, which may not be reproducible during the debugging process. For example, since a software debugger significantly alters the timing and synchronizing conditions of a program, a time dependent error that occurs during the normal execution of the program may not occur during execution with the software debugger. Therefore, what is needed is a system that allows a developer to see the probability that a line of code generates an error within a source code viewer.

A system, as described herein, allows developers to see the probability that a line of code generates an error while viewing code within a source code viewer. In an example use of such a system, a developer may open source code pertaining to an application in a source code viewer and automatically see how likely each line of code is to generate an error. This is based on an aggregate calculation of the probability that a line of code generates an error based on previous executions or error generations of the program. Over the span of multiple runs of the program, the system will collect execution and error information and calculate an error-weight for each method and line of code related to an error. In response to the execution of a program, one or more execution identifiers are received. For example, in response to the detection of an error from a program, one or more stack traces are received, where each stack trace includes one or more stack frames that correspond to a function of the program. The system identifies a call stack for each stack trace, where the call stack includes information related to the active subroutines of the program at the time error is detected.

An error-likeliness score for each stack frame is identified based on a distance of the stack frame from the stack frame which contains a crash point of the error. The stack frame including a crash point has the highest error-likeliness score, since it is the main cause of the crash. An error-weight for each of the stack frames is determined based on the identified error-likeliness scores for instances of the stack frame in the call stack. For example, an error-weight may be determined based on an average of the identified error-likeliness scores for each stack frame. Information related to the error-weight is generated and sent to a source code viewer. The source code viewer processes the error-weight information to generate a graphical effect for each line of the source code. The graphical effect indicates the probability that each line of code may generate an error. For example, the text of the lines of code that are most likely to generate an error may be highlighted, color-coded, or assigned an error number. In this way, a developer is able to see the likeliness that a line of code may generate an error prior to setting any breakpoints. Thus, this allows for a more efficient and effective coding and debugging process.

It is noted that the embodiments are not limited to this example system, but are instead applicable to other systems as would be apparent to persons skilled in the art based on the teachings provided herein. Those skilled in the art with access to the teachings provided herein will recognize additional modifications, applications, and embodiments within the scope thereof and additional fields in which the embodiments would be of significant utility. For example, an error-likeliness score may be at least partially based on the number of times a particular stack frame generates an error. The system may identify and keep track of which lines of code generate an error and store this information within a database. As a stack trace is received, each stack frame may be compared against the database. As the frequency of a particular instance of a stack frame increases, the error-likeliness score is increased accordingly. In another embodiment, a log of function calls can be stored in the database and the program can be monitored for errors. At the point of the failure of the program, all of the functions called up to that point can be assigned an error-likeliness score and weighted based on the duration between the function call and the failure.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 1 is a block diagram illustrating an aggregate stack trace system 100 for automatically displaying an aggregate of stack traces in a source code viewer. Aggregate stack trace system 100 includes one or more client computing devices 102A, 102B . . . 102N, a debug server 106 coupled to a stack trace database 110, and a source code server 108 coupled via one or more networks 104, such as the Internet or a local area network.

In general, aggregate stack trace system 100 operates as follows. Client computing devices 102A, 102B . . . 102N may run an instance of source code program 112. Client computing devices 102A, 102B . . . 102N are configured to monitor the execution of source code program 112. Source code program 112 can be any kind of computer program including a sequence of instructions written to perform a specific task on client computing devices 102A, 102B . . . 102N. For example, source code program 112 may be an application executable on client computing devices 102A, 102B . . . 102N, which allows a user to perform specific tasks such as editing or viewing a document or browsing the web. During the execution of source code program 112, execution identifiers are generated and sent to debug server 106. For example, during the execution of source code program 112, an error may be detected because of a software bug within the source code of source code program 112. A software bug is an error, failure, or fault in source code program 112 that produces an incorrect or unexpected result and causes source code program 112 to execute in unintended ways. For example, a software bug can be caused by a function attempting to access an object that does not exist (i.e. null). In such an example, the software bug can cause source code program 112 to cease the entire execution of source code program 112 or delay the execution of an instruction of source code program 112.

In response to the detection of an error within source code program 112, the execution identifiers are generated and sent to debug server 106. For example, execution identifiers can include the recorded state of the working memory of source code program 112 at the time when the error is detected. The execution identifiers may include information such as, but not limited to information related to a stack, memory management information, and operation or system flags. Debug server 106 receives the execution identifiers which can include one or more stack traces. A stack trace is information indicating the state of a program at a certain point in time during the execution of the program. For example, a stack trace can be generated from a crash caused by a software bug in source code program 112. The stack trace may provide a path to the source code in source code program 112 that caused the program error. The stack trace may indicate one or more methods or functions in source code program 112 that generated the program error or are related to the method that generated the program error. For each method or function, the stack trace may include a corresponding location in the source code, such as a line number within source code program 112.

Debug server 106 identifies a call stack for each of one or more stack traces received. A call stack includes information related to the active subroutines of source code program 112. An active subroutine is a function that has been called but has not completed execution. An active subroutine may be a nested or recursive function. For example, a subroutine "function B" may call another subroutine "function C" from four different locations within source code program 112. The call stack keeps track of the point to which each active subroutine should return control when the subroutine completes its execution. Each active subroutine is associated with a return address of a calling function. When an active subroutine completes its execution, the return address is used to return control to the calling function. In the example above, the return address of "function B" is associated with each call of "function C." When "function C" completes execution, control is returned to "function B" using the associated return address.

In an embodiment, the call stack and its associated information may be stored as a data structure such as a stack. A stack is a last-in-first-out (LIFO) data structure that allows a processor to place or "push" data onto it. Thus any data presently on the stack is given a lower execution priority as new data is pushed onto the stack. A processor can retrieve or "pop" data from the stack in a LIFO manner. As data is removed from the top of the stack, the data beneath rises to the top of the stack. Although embodiments will be described using a stack, one skilled in the art will realize other data structures may be used to manage the stack trace information, such as an array or queue.

A call stack includes a set of active stack frames. Each active stack frame corresponds to an active subroutine. In general, when a method is invoked during the execution of source code program 112, a new stack frame is generally allocated that includes information for the called method. For example, the stack frame includes information such as the arguments or parameters passed to the subroutine, the return address of the method's caller and space for the local variables of the subroutine. The set of active stack frames track the sequence of functions called up to the point where the stack trace is generated, which is up to the function that was executing when the error occurred. In general, the top of the stack trace includes the active subroutine which was executing at the time of the crash.

In response to identifying a call stack for each of the one or more stack traces received, debug server 106 identifies an error-likeliness score for each active stack frame in the call stack. An error-likeliness score identifies the probability that a stack frame caused the error in source code program 112. In an embodiment, the error-likeliness score is identified based on a distance within the call stack of the active stack frame from the stack frame containing a crash point. For example, each active stack frame may be assigned a position based on the location of the active stack frame within the stack. In general, the position of a stack frame is assigned when the stack frame is pushed onto the stack and updated as other stack frames are pushed and popped off the stack. When a stack frame is initially pushed onto the stack, it is assigned a position of 1, since it is at the top of the stack. As additional stack frames are pushed onto the stack, the position of a stack frame previously on the stack is incremented. Alternatively, as a stack frame is popped off the stack, the positions of all the stack frames on the stack are decremented.

A comparison can be made between the position of an active stack frame and the position of the stack frame containing a crash point (i.e. position 1). Based on the calculated difference in positions, an error-likeliness score is assigned. The smaller the calculated difference in positions (i.e. the closer a stack frame appears in relation to the crash point), the higher the error-likeliness score. As discussed previously, the top of the stack trace includes the active subroutine which was executing at the time of the crash. In an embodiment, a stack frame at the top of a stack trace includes the crash point. In another embodiment, a stack frame at the top of the stack trace is assigned the highest error-likeliness score within the set of stack frames of a call stack. For example, a stack frame at the top of a stack trace may be assigned an error-likeliness score in the range of 0.90 to 1.00. Such an error-likeliness score would indicate a 90% to 100% probability that the line of source code associated with the stack frame will generate an error during execution.

As a stack trace is traversed, the associated return address is identified and used to assign subsequent error-likeliness scores. As discussed previously, the return address associated with a stack frame identifies the call function, which is the function that called the method associated with the stack frame. Thus, the call function can be identified and assigned an error-likeliness score. In the example above, the call function of the active subroutine may be assigned an error-likeliness score in the range of 0.80 to 0.89, indicating a 80% to 89% probability that the call function is the cause of the error in source code program 112. The assignment scheme for error-likeliness scores may be continued for all stack frames within the set of active stack frames of the call stack. In an embodiment, the assignment scheme is based on the number of stack frames within the set of active stack frames. In the example above, as the number of stack frames increases, the stack frame at the top of the stack trace may be can be adjusted and assigned an error-likeliness score between the range of 0.95 and 1.00 and the corresponding call function may be assigned an error-likeliness score in the range of 0.90 to 0.94. Alternatively, as the number of stack frames decreases, the stack frame at top of stack trace may be assigned an error-likeliness score in the range of 0.85 to 1.00, while the associated call function may be assigned an error-likeliness score in the range of 0.50 to 0.74.

In an embodiment, the error-likeliness score for each of the stack frames is based on a logarithmic decreasing function. A logarithmic decreasing function is a function whose value decreases to zero more slowly than any nonzero polynomial. For example, an error-likeliness score may be assigned for each stack frame based on the function $1/\ln x$, where x represents the number of lines away from the crash point of the stack trace. Thus, as a stack frame moves further away from a stack frame including the crash point, the error-likeliness score would move closer to 0, indicating a lesser probability that the stack frame is the cause of the error. Although embodiments have been described using the examples above, it will be understood by one of skill in the relevant art that many types of error-likeliness assignment schemes may be used.

Debug server 106 assigns the error-likeliness score for each stack frame within the set of stack frames of the call stack and stores the information within stack trace database 110. In an embodiment, debug server 106 determines an error-weight for each of the stack frames within stack trace database 110. An error-weight for each stack frame may be based on the identified error-likeliness scores for each instance of the stack frame in the set of stack frames. For example, as one or more stack traces are received from client computing devices 102A, 102B . . . 102N, the location address of each stack frame within source code program 112 is identified. The location address of each stack frame may be monitored to identify when a received stack frame matches a stack frame stored within stack trace database 110. For example, if a stack frame is received from client computing device 102A, with a location address of "100", the stack frame is assigned an error-likeliness score and this information is stored within stack trace database 110. Another stack frame may then be received from client computing device 102B with a location address of "100", at which time debug server 106 detects that a match exists within stack trace database 110. The stack frames received from client computing device 102A and client computing device 102B are both associated with line 100 of source code program 112. Since the stack frame received from each respective client computing device can be in a different position within the stack trace, the assigned error-likeliness scores can be different and used in the aggregate to determine an error-weight.

The location address can be used as a key to store and lookup information related to the stack trace, such as the error-likeliness scores. For example, the stack trace information within stack trace database 110 may be stored within a hash table, where the location address is used as the lookup key. As a stack frame is identified, a matching stack frame is searched for within stack trace database 110 using the location address. Once a matching stack frame is found, the error-weight information associated with the stack frame is updated based on the error-likeliness score. For example, an error-weight may be updated by calculating the average of the identified error-likeliness scores for the stack frame. Debug server 106 may store the error-weight information within stack trace database 110.

Debug server 106 generates information related to the error-weight for each of the identified stack frames and sends the error-weight information to a second program residing on source code server 108. Source code server 108 is configured to run the second program in order to view, develop and analyze source code related to source code program 112. In an embodiment, the second program is a source code editor. In another embodiment, the second program is an integrated development environment. A source code editor is a text editor program designed specifically for editing source code of a computer program. It may be a standalone application or it may be included as part of an integrated development environment. An integrated development environment is a software application that provides different software development features. An integrated development environment may include a source editor, a compiler, build automation tools or a debugger.

In response to sending the error-weight information for each of the active stack frames of the call stack to source code server 108, a graphical effect is generated for each line of the source code. The graphical effect provides a visual representation of the probability that a line of source code may generate an error. Each line of the source code maps to a stack frame and the graphical effect is determined based on the error-weight corresponding to the stack frame. In an embodiment, the graphical effect is a highlight of each line of the source code in a different color based on the associated error-weight. For example, all lines of source code with an error-weight of 0.9 may be highlighted in red, while all lines of source code with an error-weight of 0.1 may not be highlighted.

In another embodiment, the graphical effect is a placement of a symbol next to each line of source code based on the error-weight. In the example above, the lines of source code with an associated error-weight of 0.9 may have the symbol "****" placed just to the left of the line of code, while the lines of source code with an associated error-weight of 0.1 may have no symbol placed next to it. In the examples above, the highlighted source code or the placement of the graphical symbols serve as an indicator to the developer that the particular line(s) of code have a high probability of generating an error. Thus, a developer has the ability to set effective break points within the source code or code around certain lines of code during software development and testing.

Source code program 112 may be any kind of computer implemented application. Source code program 112 may be a stand-alone application or accessible as part of a browser on client computing devices 102A, 102B . . . 102N. For example, source code program 112 may be a text editor or email application with access to the network via a browser. Alternatively, source code program 112 may extend the functionality of a browser. For example, source code program 112 may be a browser extension downloaded from a web server and installed on client computing devices 102A, 102B . . . 102N as part of the browser. Source code program 112 may be developed by an application developer on client computing devices 102A, 102B . . . 102N or any other computing device. A programming language, such as JavaScript may be used to develop source code program 112 on client computing devices 102A, 102B . . . 102N. Source code program 112 may then be stored locally on client computing devices 102A, 102B . . . 102N. When a program error of source code program 112 is detected, source code program 112 is configured to send the associated error information to debug server 106 via network 104.

Source code program 112, or any combination of its components, may be part of or may be implemented with a client computing device. Client computing devices 102A, 102B . . . 102N are processor-based electronic devices that are manipulated by a user and are capable of sending and receiving data over network 104. Examples of client computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Network 104 may be any network or combination of networks that can carry data communications. Such a network 104 may include, but is not limited to, a local area network, metropolitan area network, and/or wide area network such as the Internet. Network 104 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Source code server 108 may contain a combination of hardware, software, and firmware constituent parts that allow it to run an application layer with access to additional resources over a network 104. Source code server 108 may be a conventional computer such as a desktop or laptop PC, but it may additionally be any web-enabled device that is able to manage data received from debug server 106.

Stack trace database 110 may store data associated with an error generated by source code program 112, such as error-likeliness and error-weight information. Stack trace database 110 can be hosted by one or more debug servers 106. Debug server 106 delivers data within stack trace database 110 to client computing devices 102A, 102B . . . 102N and source code server 108. Stack trace database 110 can store any data that can be provided over network 104. The data stored in stack trace database 110 may be identified by a location address that is associated with each stack frame. The data within stack trace database 110 may include, for example, an indicator of the stack frame, an error-likeliness score for each stack frame, an error-weight for each stack frame, and a location address of the stack frame.

Figure 2:
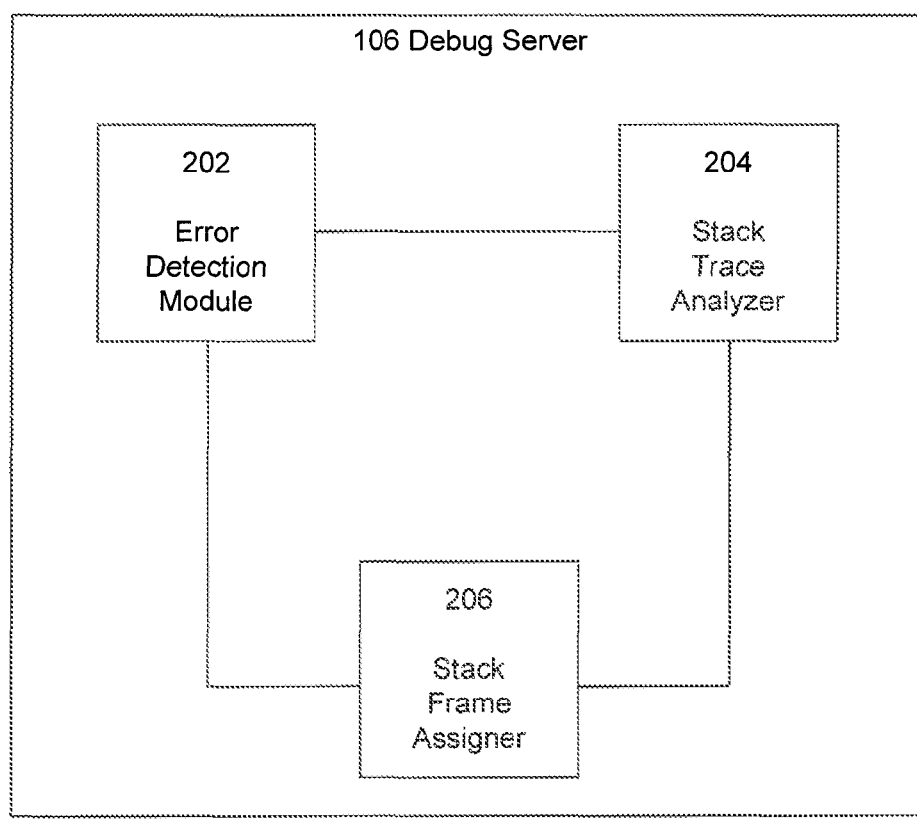
FIG. 2 is a diagram of an example of a debug server in accordance with an embodiment.
Figure 3:
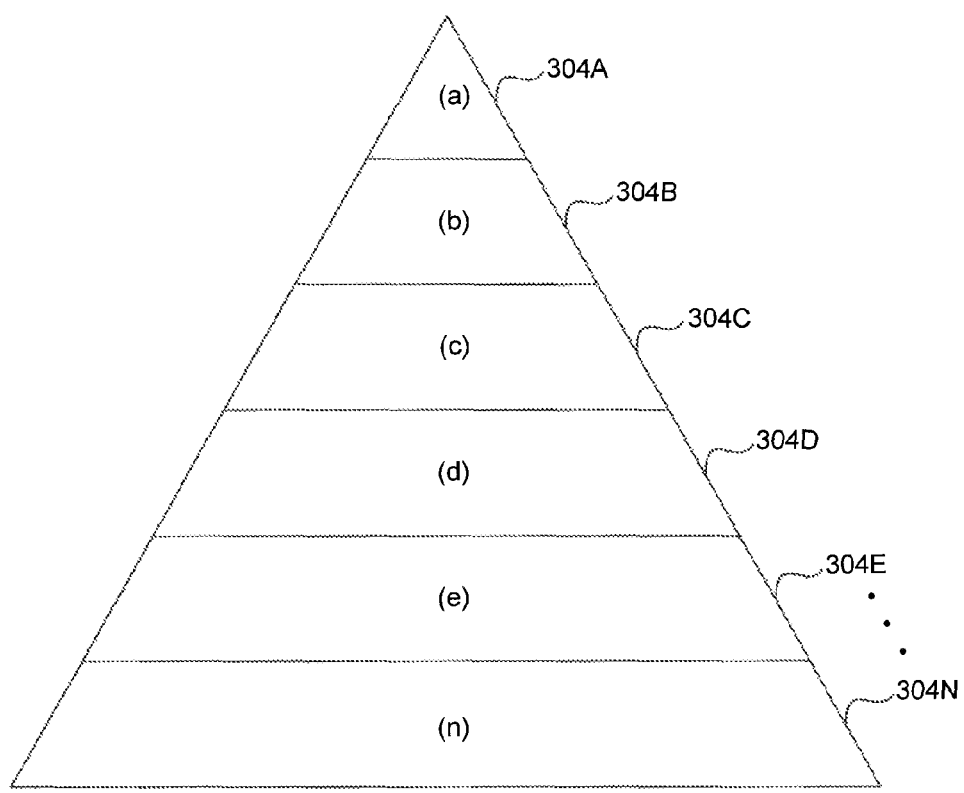
FIG. 3 is a diagram of an example of a stack trace in accordance with an embodiment.
Figure 4:
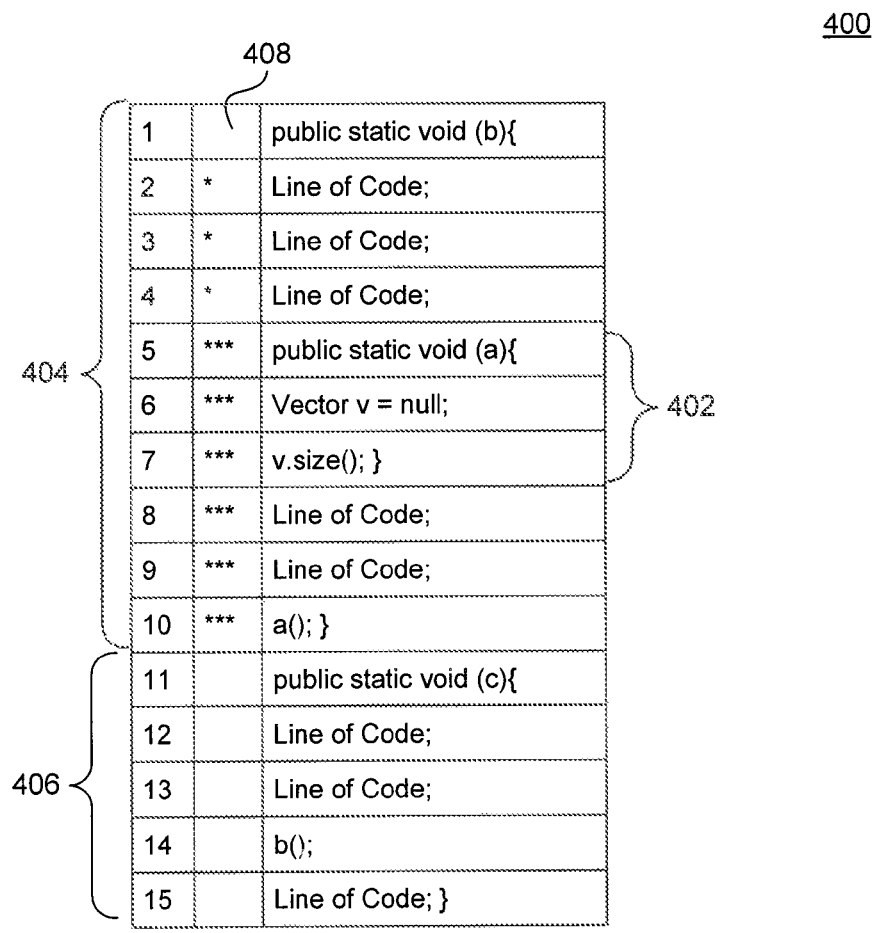
FIG. 4 is a diagram of an example of a source code viewer in accordance with an embodiment.

FIG. 2 is a diagram of an example of a debug server in accordance with embodiments. Debug server 106 includes error detection module 202, stack trace analyzer 204 and stack frame assigner 206. FIG. 2 will be discussed in relation to FIG. 3 and FIG. 4 in order to illustrate certain embodiments. FIG. 3 is a diagram of an example of a stack trace in accordance with an embodiment. FIG. 4 is a diagram of an example of a source code viewer in accordance with embodiments.

In operation, error detection module 202 is configured to receive one or more execution identifiers in response to an execution of a first program. For example, one or more stack traces may be received in response to an error detected from a first program. Alternatively, error detection module 202 can be configured to receive one or more execution identifiers in the form of a log of the function calls made during the execution of the first program. As discussed previously, each execution identifier includes information indicating the state of the first program at the point in time when the error is detected. For example, stack traces provide a path to the source code in the first program that caused the program error. The first program may be source code program 112 of FIG. 1. In an embodiment, each of the one or more stack traces includes one or more stack frames. Each stack frame corresponds to a function of the first program. For example, error detection module 202 may be configured to receive one or more stack traces similar to stack trace 300 of FIG. 3.

Stack trace 300 may be received from client computing devices 102A, 102B ... 102N due to an error detected within source code program 112. Stack trace 300 includes one or more stack frames 304A, 304B, 304C, 304D, 304E ... 304N. Stack frames 304A, 304B, 304C, 304D, 304E ... 304N correspond to functions within source code program 112. In general, when a method is invoked during the execution of source code program 112, a new stack frame is allocated that includes information for the called method. For example, the stack frame includes information such as the arguments or parameters passed to the routine, the return address of the method's caller and space for the local variables of the routine. Stack trace 300 is generated at the time source code program 112 generates an error and the top of the stack trace indicates the method which was executing at the time of the crash. In this instance, stack frame 304A is the top of the stack trace, indicating that function "a( )" was executing at the time of the error generated by source code program 112.

FIG. 4 illustrates an example of source code program 112 as viewed within a source code viewer. Source code program 112 includes multiple lines of source code 402, 404, and 406. Lines of source code 402 correspond to a method "a( )", lines of source code 404 correspond to a method "b( )", and lines of source code 406 correspond to a method "c( )" Lines of source code 402, 404, and 406, when executed, may allow a user to perform specific tasks on client computing devices 102A, 102B ... 102N, such as viewing and editing a document or browsing the web. In an embodiment, stack trace 300 is generated at the time of error generated when executing lines of source code 402, 404, and 406. For example, function "a( )" with corresponding lines of source code 402 may generate an error when it attempts to access an object that does not exist. For example, lines of source code 402 of function "a( )" points to a vector which is null. Attempts to access the vector with the instruction "v.size0" will result in a program error of source code program 112.

Returning to FIG. 3, when an instance of source code program 112 generates an error, the stack frames 304A, 304B, 304C, 304D, 304E ... 304N correspond to the lines of source code 402, 404, 406. For example, FIG. 3 illustrates a stack trace in which stack frame 304A corresponds to lines of source code 402 representing "a( )", stack frame 304B corresponds to lines of source code 404 representing "b( )" and stack frame 304C corresponds to lines of source code 406 representing "c( )". As illustrated by lines of source code 402 and 404, function "a( )" is a nested function. A nested function is a function which is encapsulated within another function. A nested function can only be called by the enclosing function or by functions directly or indirectly nested within the same enclosing function. For example function "a( )" is only executed when a call to function "b( )" is made. In this example, function "a( )" is executed when a direct call to function "b( )" is made or when function "c( )" is called since it makes a call to function "b( )" within lines of source code 406.

Stack trace analyzer 204 is configured to identify a call stack for each of the one or more stack traces received. In an embodiment, a call stack includes a set of active stack frames. Each active stack frame corresponds to an active subroutine of the first program. An active subroutine is a function that has been called but has not completed execution. The call stack keeps track of the point to which each active subroutine should return control when the subroutine completes its execution. For example, stack trace analyzer 204 may identify a call stack which includes stack frames 304A, 304B, and 304C corresponding to active subroutines "a( )", "b( )", and "c( )" respectively. Each stack frame includes information associated with a return address of its calling function. For example, stack frame 304a includes information associated with the return address of calling function "b( )" since function "b( )" is the method which called function "a( )". The set of active stack frames track the sequence of functions called up to the point where the stack trace is generated, which is up to the function that was executing when the error occurred. In general, the top of the stack trace includes the active subroutine which was executing at the time of the crash. Thus, stack frame 304a also includes information related to function "a( )" which was executing at the time of the crash.

Stack trace analyzer 204 is further configured to identify an error-likeliness score for each active stack frame in the set of active stack frames. According to an embodiment, an error-likeliness score identifies the probability that a stack frame caused the error in the first program. In an embodiment, the error-likeliness score is identified based on a distance of the stack frame from the stack frame containing the crash point. Thus, the closer a stack frame appears in relation to the crash point, the higher the error-likeliness score. In another embodiment, a stack frame at the top of the stack trace is assigned the highest error-likeliness score within the set of stack frames of a call stack. For example, stack frame 304A may be assigned an error-likeliness score in a particular range indicating that fanction "a( )" is the most likely cause for the particular error generated. For instance, stack frame 304A may be assigned an error-likeliness score of 0.9, which indicates that stack frame 304A and associated function "a( )" has a 90% probability that it is the cause of the error which generated stack trace 300.

Stack trace analyzer 204 is configured to traverse the active stack frames of stack trace 300 and assign error-likeliness scores for each subsequent stack frame. As discussed previously, the return address associated with a stack frame identifies the call function, which is the function that called the method associated with the stack frame. Thus, the call function may be identified and the corresponding stack frame may be assigned an error-likeliness score. For example, the call function of function "a( )" is function "b( )". Since function "a( )" is assigned an error-likeliness score of 0.9, stack frame 304B may be assigned an error-likeliness score of 0.8, indicating an 80% probability that stack frame 304B and associated function "b( )" is the cause of the error which generated stack trace 300.

Stack trace analyzer 204 is configured to continue using a predetermined assignment scheme to determine error-likeliness scores for all stack frames within the set of active stack frames of the call stack. In an embodiment, the assignment scheme is based on the number of stack frames within the set of active stack frames. For instance, in the previous example, as the number of stack frames increases, stack frame 304A may be assigned a error-likeliness score between the range of 0.95 and 1.00 and stack frame 304B may be assigned an error-likeliness score in the range of 0.90 to 0.94. Alternatively, as the number of stack frames decreases, stack frame 304A may be assigned an error-likeliness score in the range of 0.85 to 1.00, while stack frame 304B may be assigned an error-likeliness score in the range of 0.50 to 0.74.

In an embodiment, the error-likeliness score for each of the stack frames is based on a logarithmic decreasing function. A logarithmic decreasing function is a function whose value decreases to zero more slowly than any nonzero polynomial. The logarithmic function may be based at least in part on the number of lines away from the crash point of the stack trace. Thus, as a stack frame moves further away from a stack frame including the crash point, the error-likeliness score would approach 0, indicating a lesser probability that the stack frame is the cause of the error. For example, while stack frame 304A may be assigned an error-likeliness score near 1.0, if stack frame 304N is included within the call stack, stack frame 304N may be assigned an error-likeliness score closer to 0, such as 0.1. Stack trace analyzer 204 assigns the error-likeliness score for each stack frame within the call stack and stores the information within a stack trace database.

Stack frame assigner 206 is configured to determine an error-weight for each of the stack frames within the stack trace database. An error-weight for each stack frame may be based on the identified error-likeliness scores for each instance of the stack frame in the set of stack frames of the call stack. For example, multiple stack frames similar to stack trace 300 may be received. The position of the methods within the stack trace is based on the error generated by source code program 112. Thus, stack trace 300 represents an error generated by function "a( )" of stack frame 304A. However, another error within source code program 112 may be generated by code within function "c( )". In this scenario, function "c( )" is located at the top of the stack trace and assigned an error-likeliness score accordingly. Hence, during the first error of source code program 112, function "c( )" may be assigned an error-likeliness score of 0.7, while during another error of source code program 112, function "c( )" may be assigned an error-likeliness score of 0.9.

Stack frame assigner 206 is configured to monitor the location address of each stack frame to identify when matching stack frames have been received. For example, stack frame 304A may include location address information indicating that the error is generated at line 7 within lines of source code 402, corresponding to function "a( )" When a stack trace is received, if it includes a stack frame with a location address corresponding to line 7 of source code 402, then all prior error-likeliness score information associated with that stack frame is retrieved and the error-weight score for the stack frame is calculated. For example, an error-weight may be calculated or updated by calculating the average of the identified error-likeliness scores for the stack frame. In the example above, the error-likeliness scores of 0.7 and 0.9 for function "c( )" may be averaged to calculate an error-weight of 0.8 for function "c( )" The error-weight for each stack frame is updated dynamically when a matching stack frame is received.

Stack frame assigner 206 generates information related to the error-weight for each of the identified stack frames and sends the error-weight information to a second program. For example, the second program may be the source code viewer illustrated in FIG. 4. In an embodiment, the second program is a source code editor. In another embodiment, the second program is an integrated development environment.

In response to sending the error-weight information for each of the identified stack frames, a graphical effect is generated for each line of the source code. The graphical effect provides a visual representation of the probability that a line of source code may generate an error. In an embodiment, the graphical effect is a placement of a symbol next to each line of source code based on the error-weight. For example, column 408 of source code viewer 400 may include an indicator for the received error-weight information. In this example, column 408 includes the "***" symbol next to lines of source code 402. This indicates that lines of source code 402 have the highest probability of generating an error when the program is executed. Furthermore lines of source code 404 have the symbol "*" next to it, while lines of source code 406 have no symbol. This indicates that these lines of source code have a lesser probability of generating an error, with lines of source code 406 having the least probability of generating an error during execution of the program. In this way, a developer has the ability to know the likeliness that a certain piece of the source code will generate an error prior to doing any additional development or testing. For instance, a developer is now able to set more effective break points within the source code or code around certain lines of code during development.

Although graphical symbols are used to provide the visual representation of the error-weight information, one skilled in the art will recognize that other techniques may be used. In an embodiment, the graphical effect is a highlight of each line of the source code in a different color based on the associated error-weight. For example, all lines of source code with an error-weight of 0.9 may highlighted in red, while all lines of source code with an error-weight of 0.1 may not be highlighted. In this example, the highlighted source code in red will serve as an indicator to the developer that the particular line(s) of code have a high probability of generating an error.

In an embodiment, each of the constituent parts of debug server 106 may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium storage embodiments may include any physical medium which is capable of having instructions encoded thereon that may subsequently be used by one or more processors to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible storage medium that can serve in the role of providing instructions to one or more processors may be used to store the instructions in these embodiments.

Overview of the Method

Figure 5:
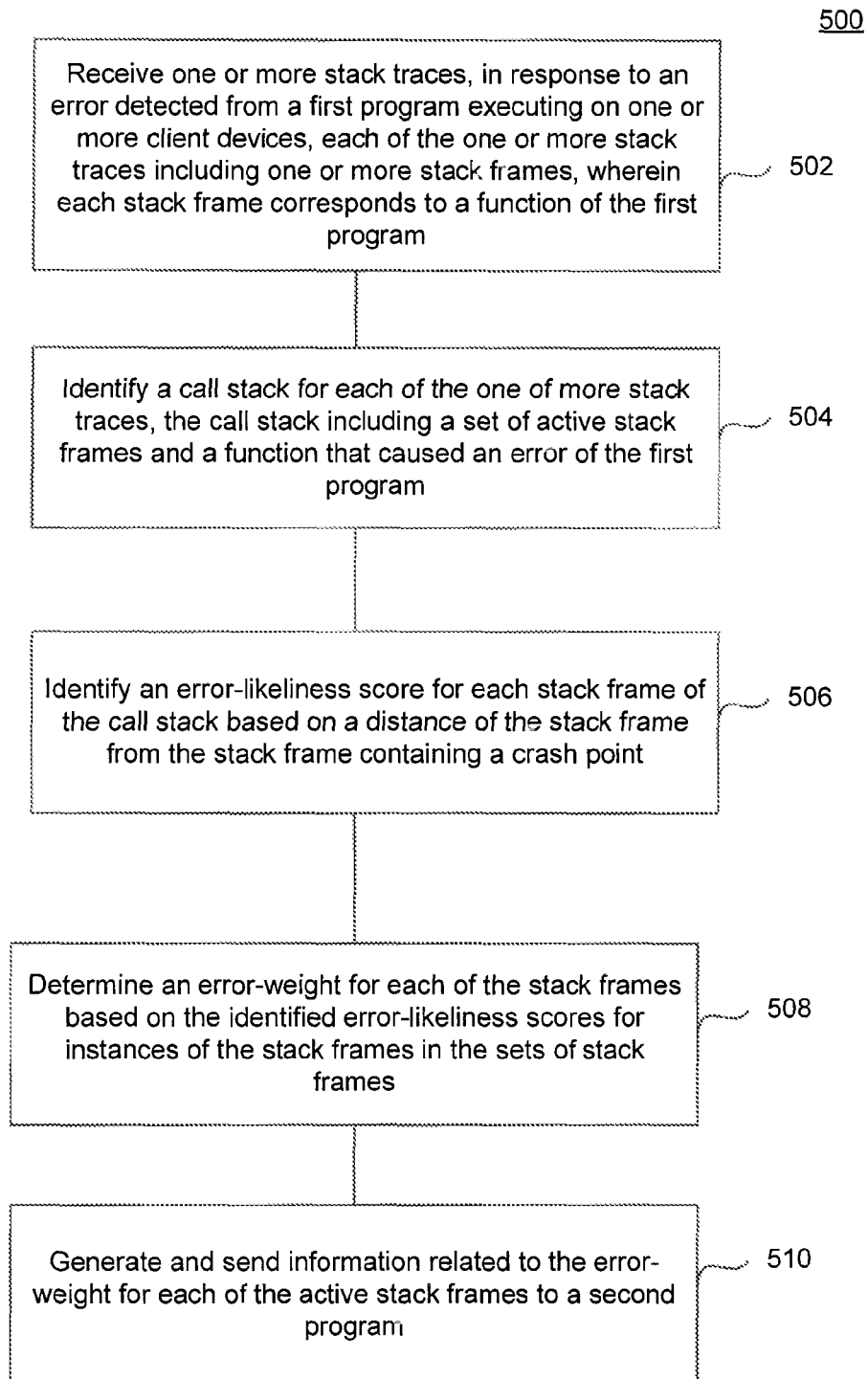
FIG. 5 is a flow chart of an example of a method for displaying aggregated stack traces.

FIG. 5 is a flow chart of an example method for displaying aggregated stack traces, according to embodiment. Embodiments will be described using a combination of FIG. 1, FIG. 2, and FIG. 5.

In stage 502, one or more stack traces are received in response to an error detected from a first program executing on or more client computing devices. A stack trace is information indicating the state of a program at a certain point in time during the execution of the program. Each of the one of more stack traces includes one or more stack frames, each stack frame corresponding to a function of the first program. The stack frame includes information such as the arguments or parameters passed to the function, the return address of the function's caller and the local variables of the function. For example, one or more stack traces may be received by debug server 106 from one or more client computing devices 102A, 102B . . . 102N. Each of the client computing devices 102A, 102B . . . 102N may run an instance of the first program. The first program can be any kind of computer program including a sequence of instructions written to perform a specific task on client computing devices 102A, 102B . . . 102N, such as a document editing or web browsing application. During the execution of the first program, an error may be detected because of a software bug within the source code of the first program. A software bug is an error, failure, or fault in the first program that causes the first program to execute in unexpected ways. For example, a software bug may cause the first program to experience an execution delay or crash.

In stage 504, a call stack is identified for each of the one or more stack traces received. For example, a call stack may be identified by stack trace analyzer 204 on debug server 106. A call stack includes information related to the active subroutines of the first program. An active subroutine is a function that has been called but has not completed execution. In general, a call stack keeps track of the point to which each active subroutine should return control when the subroutine completes its execution. Each active subroutine is associated with a return address of a calling function. When an active subroutine completes its execution, the return address is used to return control to the calling function. In embodiment, a call stack includes a set of active stack frames. Each active stack frame corresponds to an active subroutine. The set of active stack frames of the call stack track the sequence of functions called up to the point where the stack trace is generated, which is up to the function that was executing when the error occurred.

At stage 506, an error-likeliness score is identified for each of the stack frames received based on a distance of the stack frame from the stack frame containing a crash point. For example, an error-likeliness score for each stack frame may be identified by stack trace analyzer 204 on debug server 106. An error-likeliness score identifies the probability that a stack frame caused the error in source code program 112. In an embodiment, a stack frame at the top of a stack trace includes the crash point. Thus, the error-likeliness score is identified based on a position of the stack frame on the stack compared to the top of the stack trace. According to an embodiment, the closer a stack frame appears in relation to the crash point, the higher the error-likeliness score. Since the top of the stack trace includes the active subroutine which was executing at the time of the crash, a stack frame at the top of the stack trace is assigned the highest error-likeliness score within the set of stack frames of a call stack. For example, a stack frame at the top of a stack trace may be assigned an error-likeliness score in the range of 0.90 to 1.00. Such an error-likeliness score would indicate a 90% to 100% probability that the method associated with the stack frame will generate an error during the execution of the first program.

At stage 508, an error-weight for each stack frame of a call stack is determined based on the identified error-likeliness scores for instances of the stack frames in the one or more stack traces received. For example, an error-weight for each stack frame may be determined by stack frame assigner 206 on debug server 106. Stack frame assigner 206 is configured to determine an error-weight for each stack frame of a call stack based on an aggregate of the error-likeliness scores for an instance of the stack frame within the stack trace database. When a stack trace is received, if it includes an instance of a stack frame which has information stored within the stack trace database, then all prior error-likeliness score information associated with that stack frame is retrieved and the error-weight score for the stack frame is calculated. For example, an error-weight may be calculated or updated by calculating the average of the identified error-likeliness scores for the stack frame, Thus, the error-weight for each stack frame in a call stack is updated dynamically when a stack trace is received.

At stage 510, information related to the error-weight for each of the active stack frames is generated and sent to a second program. For example, stage 510 may be performed by stack frame assigner 206 on debug server 106. In an embodiment, the second program is a source code editor. In another embodiment, the second program is an integrated development environment. In response to sending the error-weight information for each of the identified stack frames, a graphical effect is generated for each line of the source code. The graphical effect indicates the probability that a line of source code may generate an error. In an embodiment, the graphical effect is a placement of a symbol next to each line of source code based on the error-weight. In another embodiment, the graphical effect is a highlight of each line of the source code in a different color based on the associated error-weight. For example, all lines of source code with an error-weight of 0.9 may appear highlighted in red, while all lines of source code with an error-weight of 0.1 may not be highlighted. In this example, the highlighted source code in red serves as an indicator to the developer that the particular line(s) of code have a high probability of generating an error. Thus a developer of the first program has the ability to know the likeliness which portions of the source code will generate an error prior to adding or modifying any source code or testing the existing source code of the first program. For instance, a developer is now able to set more effective break points within the source code or code around certain lines of code during development.

Additional Features

While embodiments have been discussed with respect to the root cause of an error being found within the stack trace associated with a bug or crash, errors can be found in functions that are not found in the stack trace, according to further embodiments.

FIG. 7 illustrates an example of source code program 700 as viewed within a source code viewer. Source code program 700 includes multiple lines of source code 702, 704, and 706. Lines of source code 702 correspond to a method "functionThatCausesAnError( )", lines of source code 704 correspond to a method "functionThatCrashes(input)", and lines of source code 706 correspond to a method "main( )" The "main( )" method is responsible for executing the entire source code program 700. In this example, the method "functionThatCausesAnError( )" returns "null" under some circumstances, but method "functionThatCrashes(input)" expects an input from "functionThatCausesAnError( )"

which is not "null." Since the method "functionThatCausesAnError( )" supplies the method "functionThatCrashes(input)" with a null reference, an error will be generated upon the call of the method "functionThatCrashes(input)". However, the method "functionThatCausesAnError( )" will not appear in the stack trace of a crash that occurs in during the call of "functionThatCrashes(input)", because by the time the method "functionThatCrashes(input)" is called, the method "functionThatCausesAnError( )" has finished executing.

In this example, instead of using stack traces as the basis for error-likeliness score assignment, the order in which the functions are called may be used. Thus, execution identifiers may be received by debug server 106 in the form of a log of the function calls made in the order in which they were executed. Debug server 106 can then be configured to monitor the execution of the program and detect when a program failure is generated. Thus, all functions which have been called up to the point of the failure are potentially relevant and the error-likeliness scores can be assigned based on the duration between the function calls and the failure. For example, a log of the last 100 function calls made by the program can be received along with timing information indicating when the function was called. At the time a failure of the program is detected, the timing information of the failure can be compared against the time that each function call is called and an error-likeliness score can be assigned based on the time difference. As the duration between a function call and an failure detection increases, a function will have a lesser probability of having caused the error. Over time, multiple aberrant executions of the program can be monitored and functions that have been called may be assigned an error-weight based on an aggregate of the error-likeliness scores, as discussed previously.

Figure 8:
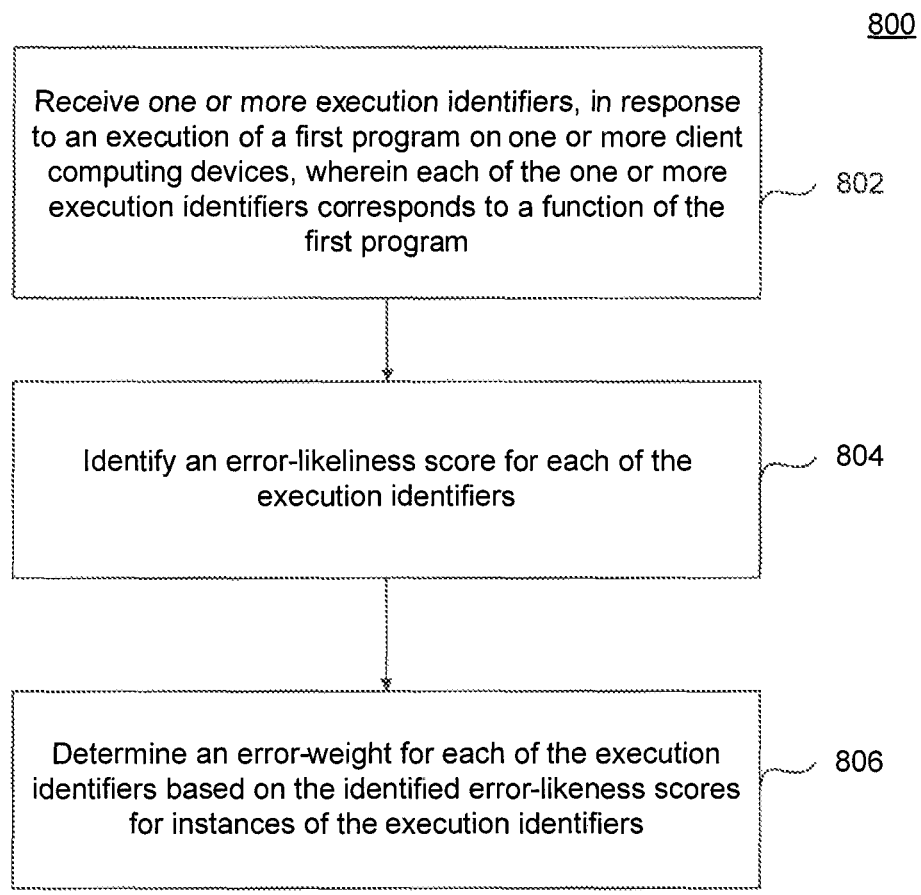
FIG. 8 is a flow chart of an example of a method for displaying aggregated stack traces.

FIG. 8 is a flow chart of an example method, according to an embodiment. Embodiments will be described using a combination of FIG. 1, FIG. 2, and FIG. 8.

In stage 802, one or more execution identifiers are received in response to an execution of a first program operating on or more client computing devices. Execution identifiers include information indicating the state of a program at a certain point in time during the execution of the program. For example, the execution identifiers may be a log including an ordered list of all the function calls executed up until the point at which the first program generated an error. The log may include the name of the function, location of the function and a time at which it was called. In an example, one or more execution identifiers may be received by debug server 106 from one or more client computing devices 102A, 102B . . . 102N.

At stage 804, an error-likeliness score is identified for each of the execution identifiers. For example, an error-likeliness score for each stack frame may be identified by stack trace analyzer 204 on debug server 106. An error-likeliness score identifies the probability that a stack frame caused the error in the first program. In an embodiment, at the time a failure of the program is detected, the timing information of the failure can be compared against the time that each function call was made and an error-likeliness score can be assigned accordingly. As the duration between a function call and a failure detection increases, a function will have a lesser probability of having caused the error. Conversely, the closer in duration between a time that a function was called and an error was detected, the higher the error-likeliness score. The error-likeliness information for each method called can be stored in a database.

At stage 808, an error-weight for each execution identifier is determined. For example, an error-weight for each execution identifier may be determined by stack frame assigner 206 on debug server 106. The error-weight for each execution identifier is determined in the same manner as described in step 508 of method 500. Thus, stack frame assigner 206 is configured to determine and dynamically update an error-weight for each execution identifier based on an aggregate of the error-likeliness scores for an instance of the execution identifier within the database.

Computer System

Figure 6:
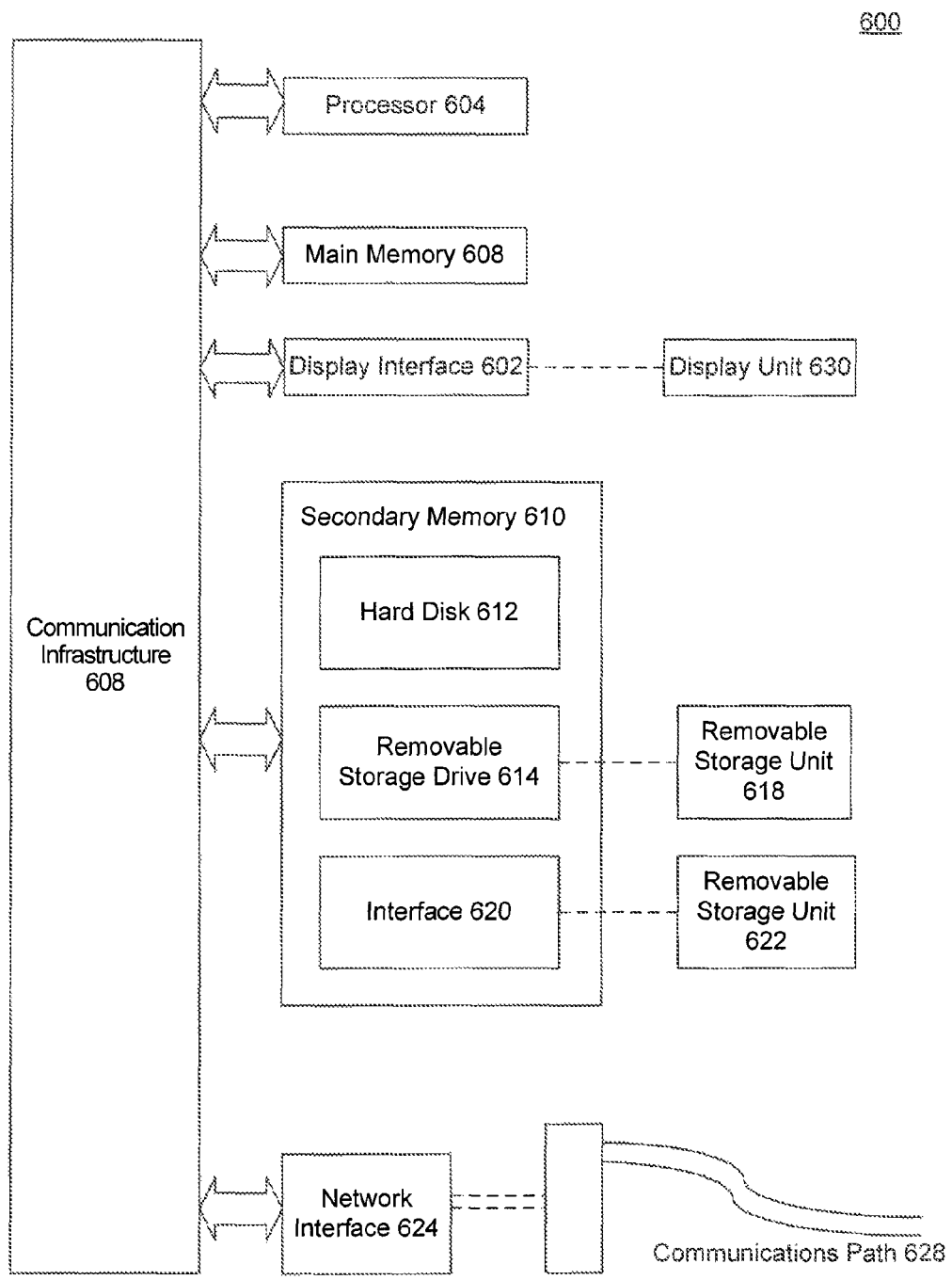
FIG. 6 is a diagram of an example system that may be used to implement embodiments disclosed herein.

Various aspects of the present invention can be implemented by software, firmware, hardware, or a combination thereof, FIG. 6 illustrates an example computer system 600 in which the embodiments, or portions thereof, can be implemented as computer-readable code. For example, aggregate stack trace system 100 carrying out method 500 of FIG. 5 can be implemented in system 600. Various embodiments of the invention are described in terms of this example computer system 600.

Computer system 600 includes one or more processors, such as processor 604. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive and/or a removable storage drive. Removable storage drive 614 may include a floppy disk drive, a magnetic tape drive, an optical disk drive, a flash memory, or the like. The removable storage drive 614 reads from and/or writes to removable storage unit 618 in a well-known manner. Removable storage unit 618 may include a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the term "computer readable storage medium" is used to generally refer to storage media such as removable storage unit 618, removable storage unit 622, and a hard disk installed in hard disk drive 612. Computer readable storage medium can also refer to one or more memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the embodiments as discussed herein. In particular, the computer programs, when executed, enable processor 604 to implement the processes of embodiments of the present invention, such as the steps in the methods discussed above. Accordingly, such computer programs represent controllers of the computer system 600. Where embodiments are implemented using software, the software may be stored in a computer program product and loaded into computer system 600 using removable storage drive 614, interface 620, or hard drive 612.

Embodiments may be directed to computer products comprising software stored on any computer readable medium. Such software, when executed in one or more data processing devices, causes a data processing device(s) to operate as described herein.

Embodiments may be implemented in hardware, software, firmware, or a combination thereof. Embodiments may be implemented via a set of programs running in parallel on multiple machines.

CONCLUSION

The Summary and Abstract sections may set forth one or more but not all example embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A computer-implemented method comprising:
    receiving, by a computing device, one or more execution identifiers, in response to an execution of a first program on one or more client computing devices, wherein each of the one or more execution identifiers corresponds to a function of the first program;
    identifying, by the computing device, an error-likeliness score for each of the execution identifiers; and
    determining, by the computing device an error-weight for each of the execution identifiers based on the identified error-likeliness scores for instances of the execution identifiers.

2. The method of claim 1, wherein the one or more execution identifiers are one or more stack traces received in response to an error detected from the first program.

3. The method of claim 1, wherein the one or more execution identifiers are one or more logs, wherein each log includes an ordered list of all function calls executed up until a point at which the first program generated an error.

4. The method of claim 1, wherein identifying an error-likeliness score comprises:
    identifying, by the computing device, a call stack for each of the one of more execution identifiers, the call stack including a set of active stack frames and a function that caused an error of the first program; and
    identifying, by the computing device, the error-likeliness score for each active stack frame of the call stack based on a distance of the stack frame from the stack frame containing a crash point.

5. The method of claim 4, wherein identifying a call stack for each of the one of more execution identifiers comprises:
    identifying an active subroutine for each of the one or more active stack frames of the call stack, wherein the active subroutine is a function executing at the time of a crash; and
    identifying subroutines related to the active subroutine, wherein the identified subroutines are functions that call each other up to the active subroutine.

6. The method of claim 4, wherein the error-likeliness score for each of the active stack frames of the call stack is based on a logarithmic decreasing function.

7. The method of claim 1, wherein identifying an error-likeliness score comprises:
    identifying, by the computing device, a set of function calls executed up until a point at which the first program generated an error;
    identifying a time when the first program generated an error; and
    identifying, by the computing device, the error-likeliness score for each function call based on a comparison of the time when the first program generated an error and a time that each function call is called.

8. The method of claim 1, wherein determining an error-weight score comprises:
    determining, by the computing device an error-weight for an active stack frame of a call stack based on identified error-likeliness scores for instances of the active stack frame in the call stack.

9. The method of claim 1, wherein determining an error-weight score comprises:
    determining, by the computing device an error-weight for a function call based on identified error-likeliness scores for instances of the function call.

10. The method of claim 1, further comprising:
    generating, by the computing device, information related to the error-weight for each of the execution identifiers; and
    sending, by the computing device, the error-weight information to a second program, the second program displaying a set of lines of source code for the first program and wherein each line of the source code maps to a stack frame and a graphical effect is generated for each displayed line of the source code based on the error-weight of the corresponding stack frame.

11. The method of claim 10, wherein the graphical effect is a highlight of each line of the source code in a different color based on the error-weight.

12. The method of claim 10, wherein the graphical effect is a placement of a different symbol next to each line of the source code based on the error-weight.

13. The method of claim 10, wherein the second program is an integrated development environment.

14. The method of claim 10, wherein the second program is a source-level debugger.

15. The method of claim 1, wherein the error-weight is based on an average of the identified error-likeliness scores for the execution identifiers.

16. A system comprising:
   an error detection module configured to receive one or more execution identifiers, in response to an execution of a first program, wherein each of the one or more execution identifiers corresponds to a function of the first program;
   a stack Trace analyzer configured to identify an error-likeliness score for each of the execution identifiers; and
   a stack frame assigner configured to determine an error-weight for each of the execution identifiers based on the identified error-likeliness scores for instances of the execution identifiers.

17. The system of claim 16, wherein the one or more execution identifiers are one or more stack traces received in response to an error detected from the first program.

18. The system of claim 16, wherein the one or more execution identifiers are one or more logs, wherein each log includes an ordered list of all function calls executed up until a point at which the first program generated an error.

19. The system of claim 16, wherein the stack trace analyzer is further configured to identify a call stack for each of the one of more execution identifiers, the call stack including a set of active stack frames and a function that caused an error of the first program, and further configured to identify the error-likeliness score for each active stack frame of the call stack based on a distance of the stack frame from the stack frame containing a crash point.

20. The system of claim 19, wherein the stack trace analyzer is further configured to identify an active subroutine for each of the one or more active stack frames of the call stack, wherein the active subroutine is a function executing at the time of the error and further configured to identify subroutines related to the active subroutine, wherein the identified subroutines are functions that call each other up to the active subroutine.

21. The system of claim 19, wherein the error-likeliness score for each of the active stack frames of the call stack is based on a logarithmic decreasing function.

22. The system of claim 19, wherein the stack frame assigner is further configured to determine an error-weight for each active stack frame of the call stack based on identified error-likeliness scores for instances of the active stack frames in the call stack.

23. The system of claim 22, wherein the error-weight is based on an average of the identified error-likeliness scores for the active stack frames of the call stack.

24. The system of claim 16, wherein the stack trace analyzer is further configured to identify, all function calls executed up until a point at which the first program generated an error, identify a time when the first program generated an error, and identify the error-likeliness score for each function call based on a comparison of the time when the first program generated an error and a time that each function call is called.

25. The system of claim 16, wherein the stack frame assigner is further configured to determine an error-weight for a function call based on identified error-likeliness scores for instances of the function call.

26. The system of claim 16, wherein the stack frame assigner is further configured to generate, information related to the error-weight for each of the active stack frames and send the information to a second program, the second program displaying lines of source code for the first program, wherein each line of the source code maps to a stack frame and a graphical effect is generated for each line of the source code based on the error-weight of the corresponding stack frame.

27. The system of claim 26, wherein the graphical effect is a highlight of each line of the source code in a different color based on the error-weight.

28. The system of claim 26, wherein the graphical effect is a placement of a different symbol next to each line of the source code based on the error-weight.

29. The system of claim 26, wherein the second program is an integrated development environment.

30. The system of claim 26, wherein the second program is a source-level debugger.

31. A computer readable storage medium having control logic stored therein that, in response to execution by a computing device, causes the computing device to perform operations, the control logic comprising:
   a first computer readable program code to cause the computing device to receive one or more stack traces, in response to an error detected from a first program, each of the one or more stack traces including one or more stack frames, wherein each stack frame corresponds to a function of the first program;
   a second computer readable program code to cause the computing device to identify a call stack for each of the one or more stack traces, the call stack including a set of active stack frames and a function that caused an error of the first program;
   a third computer readable program code to cause the computing device to identify an error-likeliness score for each active stack frame of the call stack based on a distance of the stack frame from the stack frame containing a crash point; and
   a fourth computer readable program code to cause the computing device to determine an error-weight for each of the active stack frames of the call stack based on the identified error-likeliness score for instances of the stack frames in the set of stack frames.

32. The computer readable storage medium of claim 31, further comprising:
   a fifth computer readable program code to cause the computing device to generate information related to the error-weight for each of the active stack frames of the call stack; and
   a sixth computer readable program code to cause the computing device to send the information to a second program, the second program displaying a source code for the first program, wherein each line of the source code maps to a stack frame and a graphical effect is generated for each line of the source code based on the error-weight of the corresponding stack frame.

33. The computer readable storage medium of claim 31, further comprising:
   a seventh computer readable program code to cause the computing device to identify an active subroutine for each of the one or more active stack frames of the call stack, wherein the active subroutine is a function executing at the time of a crash; and an eight computer readable program code to cause the computing device to identify subroutines related to the active subroutine, wherein the identified subroutines are functions that call each other up to the active subroutine.

34. The computer readable storage medium of claim 31, wherein the error-likeliness score for each of the identified stack frames is based on a logarithmic decreasing function.

* * * * *